US005434112A

United States Patent [19]

Matsui et al.

[11] Patent Number: 5,434,112

[45] Date of Patent: Jul. 18, 1995

[54] HIGH PRESSURE INJECTION NOZZLE

[75] Inventors: Shigetomo Matsui, Higashiosaka; Hiroyuki Matsumura, Kobe; Yoshikazu Ikemoto, Kobe; Yasuhiro Kumon, Kobe; Shigeru Nakayama, Kobe; Keiji Tsujita, Akashi; Keisuke Fukunaga, Chiba; Nobuhiro Kuribayashi, Nishinomiya; Kenichi Wakana, Nishinomiya, all of Japan

[73] Assignee: Kawasaki Jukogyo Kabushiki Kaisha, Hyogo, Japan

[21] Appl. No.: 183,822

[22] Filed: Jan. 21, 1994

Related U.S. Application Data

[63] Continuation-in-part of Ser. No. 154,718, Nov. 19, 1993, Pat. No. 5,334,561, which is a continuation of Ser. No. 760,509, Sep. 16, 1991, abandoned.

[30] Foreign Application Priority Data

| | | | |
|---|---|---|---|
| Sep. 20, 1990 | [JP] | Japan | 2-248616 |
| Jun. 11, 1991 | [JP] | Japan | 3-165251 |
| Jun. 11, 1991 | [JP] | Japan | 3-165252 |

[51] Int. Cl.[6] ........ C04B 35/56

[52] U.S. Cl. ........ 501/87; 501/96; 419/18; 419/15; 419/16; 239/DIG. 19

[58] Field of Search ........ 501/87, 96; 419/18, 419/15, 16; 239/DIG.19

[56] References Cited

U.S. PATENT DOCUMENTS

| | | | |
|---|---|---|---|
| 2,040,592 | 5/1936 | Becker | 419/16 |
| 3,094,402 | 3/1992 | Perret, Jr. et al. | 239/DIG. 19 |
| 4,753,678 | 6/1988 | Maruyama et al. | 75/238 |
| 4,923,515 | 5/1990 | Timm et al. | 419/15 |

FOREIGN PATENT DOCUMENTS

| | | |
|---|---|---|
| 240879 | 10/1987 | European Pat. Off. . |
| 360567 | 3/1990 | European Pat. Off. . |
| 61-012847 | 1/1986 | Japan . |

*Primary Examiner*—Mark L. Bell
*Assistant Examiner*—C. Bonner
*Attorney, Agent, or Firm*—Oliff & Berridge

[57] ABSTRACT

A high pressure injection nozzle member is formed of a super hard alloy or a hard material of carbide series mainly composing of a tungsten carbide as, wherein the tungsten carbon is composed of grains each having a diameter of less than 1 μm. At least one kind of carbide or solid solution of carbide selected from Ti, Ta, V, Cr, Mo, Hf, or Zr by a weight % of less than 10.0% is added. A binding material essentially consisting of at least one of iron group elements by weight % of 0.2 to 2.0% may be further added. The super hard alloy or a hard sintered material has a high abrasion proof property and has a hardness more than about HRA 94.0. Nitride or nitride solid solution may be utilized in place of carbide or carbide solid solution. The nozzle member is particularly suitable for an abrasive water jet.

7 Claims, 12 Drawing Sheets

HIGH PRESSURE INJECTION NOZZLE

This is a Continuation-in-Part of Application Ser. No. 08/154,718, filed Nov. 19 1993, U.S. Pat. No. 5,334,561, which in turn is a Continuation of Application Ser. No. 07/760,509, filed Sep. 16, 1991, now abandoned.

BACKGROUND OF THE INVENTION

The present invention relates to a technology for a high pressure injection nozzle member for working a work and more particularly, to a material for a high pressure injection nozzle adapted for an abrasive water jet and made of a hard material or cemented carbide alloy having a high abrasion proof or resistance property.

Recently, there has been provided various mechanical and electric machines, instruments, elements and parts having complicated and precise structures, which result in complicated manufacturing and assemblying processes and this tendency has also been accelerated.

Moreover, since it is required for these machines, instruments, elements and parts to be manufactured, inspected and maintained so as not to change their function with the lapse of time, the precision and performance thereof have been more highly required. In addition, since these machines, instruments, elements and parts are provided with various cut surfaces and surfaces to be cut or worked and it is required to have excellent durability for the maintenance or the like, these surfaces are to be cut or worked for more precise performance.

In order to satisfy these requirements in recent technology, it has also be required to study and develop new materials, and accordingly, new technology or techniques for cut working, cutout separation working or the like working have been studied and developed.

In a conventional cut working or cutout separation working technology, there has been, provided various means, for example, mechanical means such as cutter or the like, thermal fusing means utilizing a gas burner or arc, for example, or other physical cutting means utilizing plasma, for example. However, in the recent technology, such requirements have been made severe for the cut working of complicated portions and the separation cutting of molecular binding portions, and accordingly, in order to avoid decomposition of a base material or to avoid generation of burrs or the like, a non-contact working method has been required. The conventional technology is however not sufficient for satisfying such requirements for practical use.

There has been further provided a cutting technology, in order to satisfy these requirement, utilizing water jet, in which the cutout separation working for coats, drilling working, grooving working, cutting working of the material, and the like working are carried out by means of water jet of highly pressurized beam form having about several hundred or several tens of hundreds bars. This method has been utilized for cutting metal material as well as wood or synthetic resin material and, therefore, has been studied and developed. For example, is proposed an abrasive type water jet nozzle, for improving the working efficiency, by mixing abrasive material of fine grain or particle structure into the high pressure water jet. However, even in such technology, there remains many problems for hardware or software techniques because of the use of the high pressure water jet.

In the meantime, the cut working caused by such a water jet involves substantially no generation of heat in the actual cut working, resulting in no decomposition or no deformation of the material to be cut, thus being preferred for the extremely smooth cut working of the material, satisfying the desire on the design. In this viewpoint, such water jet cut working technique is one promising cut working technique for so-called a net shape or near net shape working. Accordingly, such cut working techniques have been also studied from before and are in partial practical use.

However, the abrasive type water jet cut working has not been widely utilized until recently for cut working requiring extremely high cutting performance.

The characteristic feature of cemented carbon alloy or hard material is generally determined in accordance with an amount of a binder such as Co, and the composition and kind of hard carbon, the diameter of each grain composing the hard carbon, an amount of carbon contained in the alloy, and the like. These factors are determined, in actuality, in accordance with required characteristics—such as hardness, abrasion proof property, tenacity, anti-corrosion property, strength against high temperature, or the like, based on the practical use.

In another aspect, various characteristic features may be required for tools to be used. However, it is considerably difficult to satisfy all of these requirements or factors, and accordingly, these factors have been selectively weighed and utilized in accordance with the material to be cut and the actual cutting conditions.

Generally, the hardness and the tenacity of the cemented carbon alloy or hard material have relatively opposing relationship with respect to WC (tungsten carbide) grains and the amount of Co. Namely, the hardness is made higher as the grain diameter becomes smaller and the amount of Co in the binding phase decreases. On the contrary, the tenacity is made high in proportion to the increasing of the Co amount.

The cemented carbon alloy or the hard material, as described hereinabove, has been utilized for cutting tools, tools having an abrasion proof property, or the like, and these tools have been designed by basically considering the hardness of the alloy, whereas the tools have been also designed by considering to a certain extent the tenacity in the viewpoint of preventing the tools from being bent or deformed and chipping.

In the conventional technology, usually, the material for the abrasive water jet nozzle has been selected from the cemented carbon alloy material or hard material for a tool, but, regarding the hardness thereof, alloys having a hardness slightly smaller than the possibly maximum hardness have been selected. Accordingly, the cemented carbon alloy material or the hard material for the water jet nozzle are greatly worn in elapse of time and the durability of such cemented carbon alloy or hard material as the abrasive water jet nozzle material is merely several hours in the practical use, resulting in poor application for satisfying such recent requirements as described hereinbefore.

A main factor for the severe abrasion of the nozzle such as water jet nozzle will be based on erosion of the nozzle material with respect to the cemented carbon alloy or the hard material due to grains or powders of fine metallic particles in the water jet.

In the meantime, there is known, as a specific sintered alloy, so-called a binder-less alloy such as WC-TaC-TiC of hard material including no Co for improving the anti-corrosion property, but such a specific sintered alloy is of a binder-less structure, and accordingly, the hardness is naturally increased and an alloy having HRA 94.0 or near has been utilized in practical use.

The abrasion proof property of the nozzle such as described water jet nozzle has been improved in comparison with that of the conventionally utilized cemented carbon alloy or hard material for a generally used tool in proportion to the degree of increased hardness. However, there exists a considerable gap between the actual degree of durability and the object or required degree thereof, thus not being satisfactory.

As described above, in view of various viewpoints, it may be said that the existing material for the water jet nozzle is not provided with the desired combination of optimum hardness and tenacity, and accordingly, further improvement or development has been highly required.

Consequently, as described hereinbefore, nozzles such as abrasive water jet nozzles are subjected to severe jetting abrasion in practical use due to the erosion of fine grains or particles contained in the water jet, so that the abrasion of the material is very remarkable, and particularly, an inlet mouth portion and an outlet portion of the water jet nozzle are subjected to extremely violent abrasion. This results in the expansion of the inner diameter of the water jet nozzle in elapse of time, which will further result in the degradation of the cutting efficiency and performance with respect to a workpiece to be cut.

As countermeasure to the above defects, it is necessary to exchange with a new nozzle every relatively short time period of practical use, resulting in the lowering of the working efficiency.

SUMMARY OF THE INVENTION

An object of the present invention is to substantially eliminate defects or drawbacks encountered in the prior art and to provide a high pressure injection nozzle manufactured by an improved cemented-carbide alloy or hard material capable of improving the abrasion resistance property and the durability of the nozzle and hence improving the workability and working performance thereof.

This and other objects can be achieved according to the present invention, in one aspect, by providing a high pressure injection nozzle member formed of a super hard alloy comprising tungsten carbide as a main component and a fine amount of carbide, wherein the, tungsten carbon is composed of grains each having a diameter of less than 1 μm, further comprising at least one kind of carbide or solid solution of carbide selected from Ti, Ta, V, Cr, Mo, Hf, or Zr by weight % of 0.5 to 10.0%, and a binding material essentially consisting of at least one of iron group elements by weight % of 0.2 to 2.0%, and the super hard alloy has a high abrasion proof property and has a hardness more than HRA 94.5.

In another aspect, there is provided a high pressure injection nozzle member formed of a hard material of carbide series mainly comprising a tungsten, wherein the hard carbide material is composed of grains each having a diameter of less than 1 μm, further comprising one, two or more kinds of carbides or solid solutions of carbides selected from Ti, Ta, V, Cr, Nb, Mo, Hf, or Zr by a total weight % of less than 10%, and the nozzle member is formed of a hard sintered material having a high abrasion proof property and has a hardness more than HRA 94.0. In the similar aspect, there is provided a high pressure injection nozzle member formed of a hard material of carbide or nitride series mainly comprising a tungsten, wherein the hard carbide material is composed of grains each having a diameter of less than 1 μm, further comprising one, two or more kinds of carbides or nitride, or solid solutions of carbides or nitrides selected from Ti, Ta, V, Cr, Nb, Mo, Hf, or Zr by a total weight % of less than 10%, and the nozzle member is formed of a hard sintered material having a high abrasion proof property and has a hardness more than HRA 94.0.

In a further aspect, there is provided a high pressure injection nozzle member formed of a hard material of carbide series mainly comprising a tungsten, wherein the hard carbide material is composed of grains each having a diameter of less than 1 μm, further comprising one, two or more kinds of carbides or solid solutions of carbides selected from Ti, Ta, V, Cr, Nb, Mo, Hf, or Zr by a total weight % of less than 10% and a binding material essentially consisting of at least one kind of material selected from Co, Ni, Fe, Au, Ag, Cu alloy, or Al alloy by weight % of less than 2.0% and the nozzle member is formed of a hard sintered material having a high abrasion proof property and has a hardness of more than HRA 94.0. In the similar aspect, there is also provided a high pressure injection nozzle member formed of a hard material of carbide or nitride series mainly comprising a tungsten, wherein the hard carbide material is composed of grains each having a diameter of less than 1 am, further comprising one, two or more kinds of carbides or nitride, or solid solutions of carbides or nitrides selected from Ti, Ta, V, Cr, Nb, Mo, Hf, or Zr by a total weight % of less than 10% and a binding material essentially consisting of at least one kind of material selected from Co, Ni, Fe, Au, Ag, Cu alloy, or Al alloy by weight % of less than 2.0% and the nozzle member is formed of a hard sintered material having a high abrasion proof property and has a hardness more than HRA 94.0.

In the foregoing aspects, the nozzle member is formed for an abrasive water jet.

According to the embodiments of the present invention of the characters described above, the abrasion proof property can be extremely improved and the durability of the nozzle member can be also highly improved.

BRIEF DESCRIPTION OF THE DRAWINGS

For a better understanding of the present invention and to show how the same is carried out, reference will be first made to the accompanying drawings, in which.

DETAILED DESCRIPTION OF THE INVENTION

As described hereinbefore, as a significant cause for the severe abrasion to a nozzle, such as an abrasive water jet nozzle for cut working operation, there will be pointed out the erosion of the cemented carbon alloy as a material for the nozzle due to abrasive particles contained in the water jet. In order to clarify the erosion characteristics of the cemented carbon alloy for the present invention as well as technology for this art of field, an abrasion test method for realizing the abrasion conditions in the abrasive water jet nozzle (super high pressure jet abrasion test) was conceived and experiments and adjustments were carried out for clarifying the characteristic features of the various kinds of cemented carbon alloys including test alloys.

Figure 1:
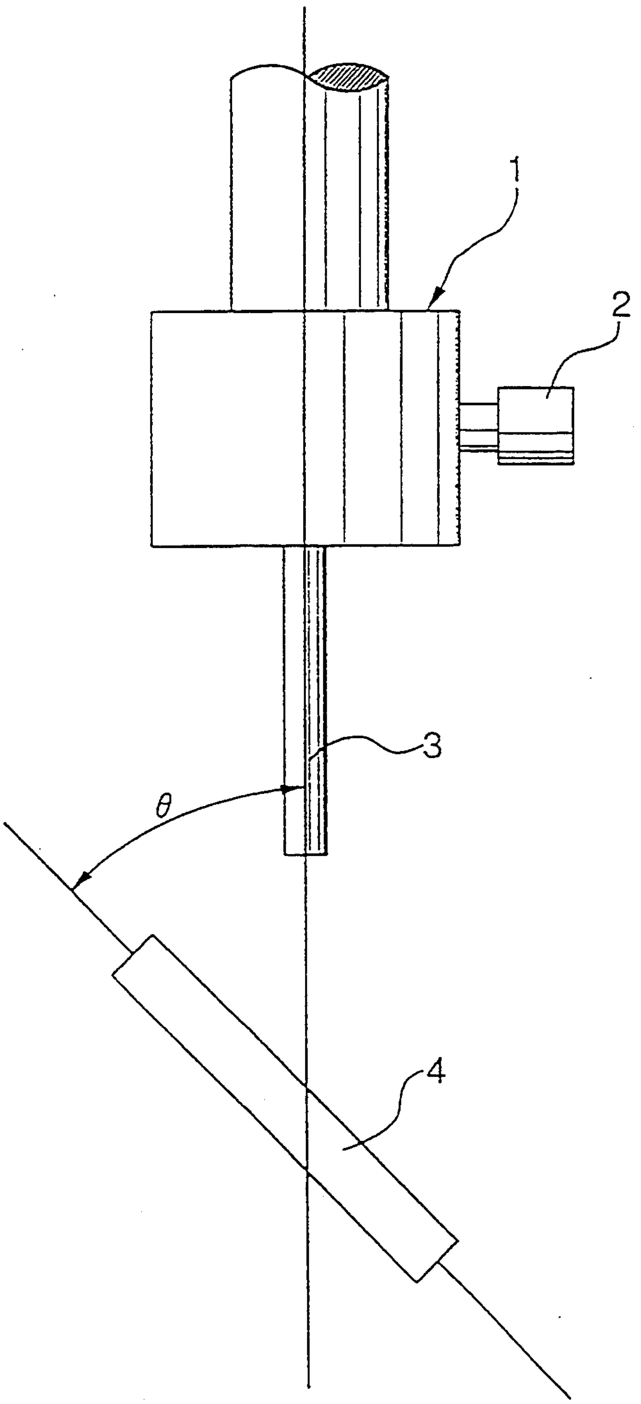
FIG. 1 is an illustration of a test model for realizing abrasion tests by means of water jet nozzle.

FIG. 1 shows an illustration of a model for carrying out these tests, in which a nozzle head 1 is provided with an abrasive water jet nozzle 3 extending downwardly from the nozzle head 1 and a work 4 as an experimental piece against which abrasive water jet from the nozzle 3 collides. The work 4 is arranged so as to have an inclination, collision angle, $\theta$ with respect to the jetting direction of the water jet from the nozzle 3. Reference numeral 2 denotes an abrasive material supply port member.

Figure 2:
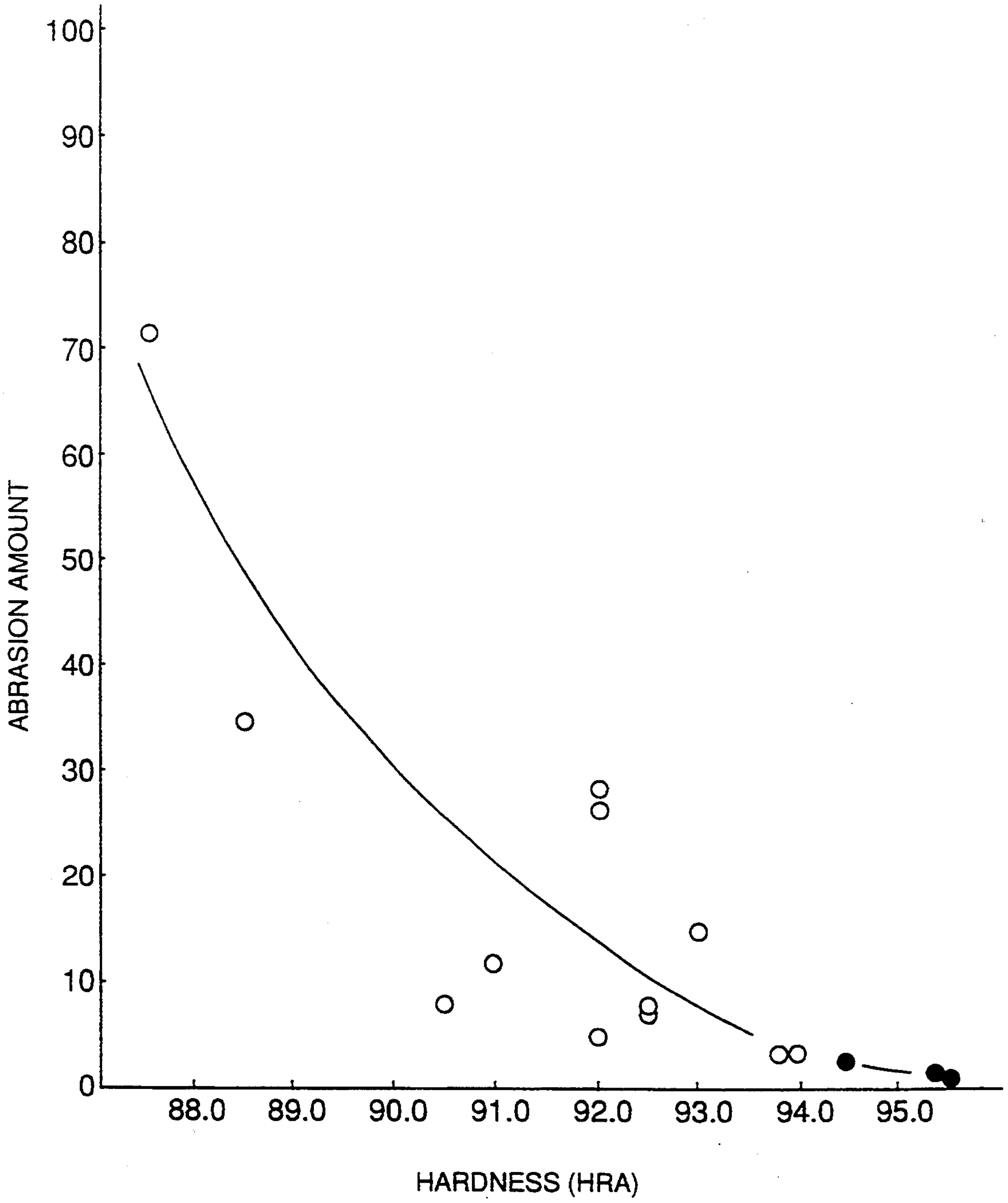
FIG. 2 is a graph representing a relationship between a hardness of a material and an amount of abrasion according to one embodiment of the present invention and a conventional example.
Figure 3:
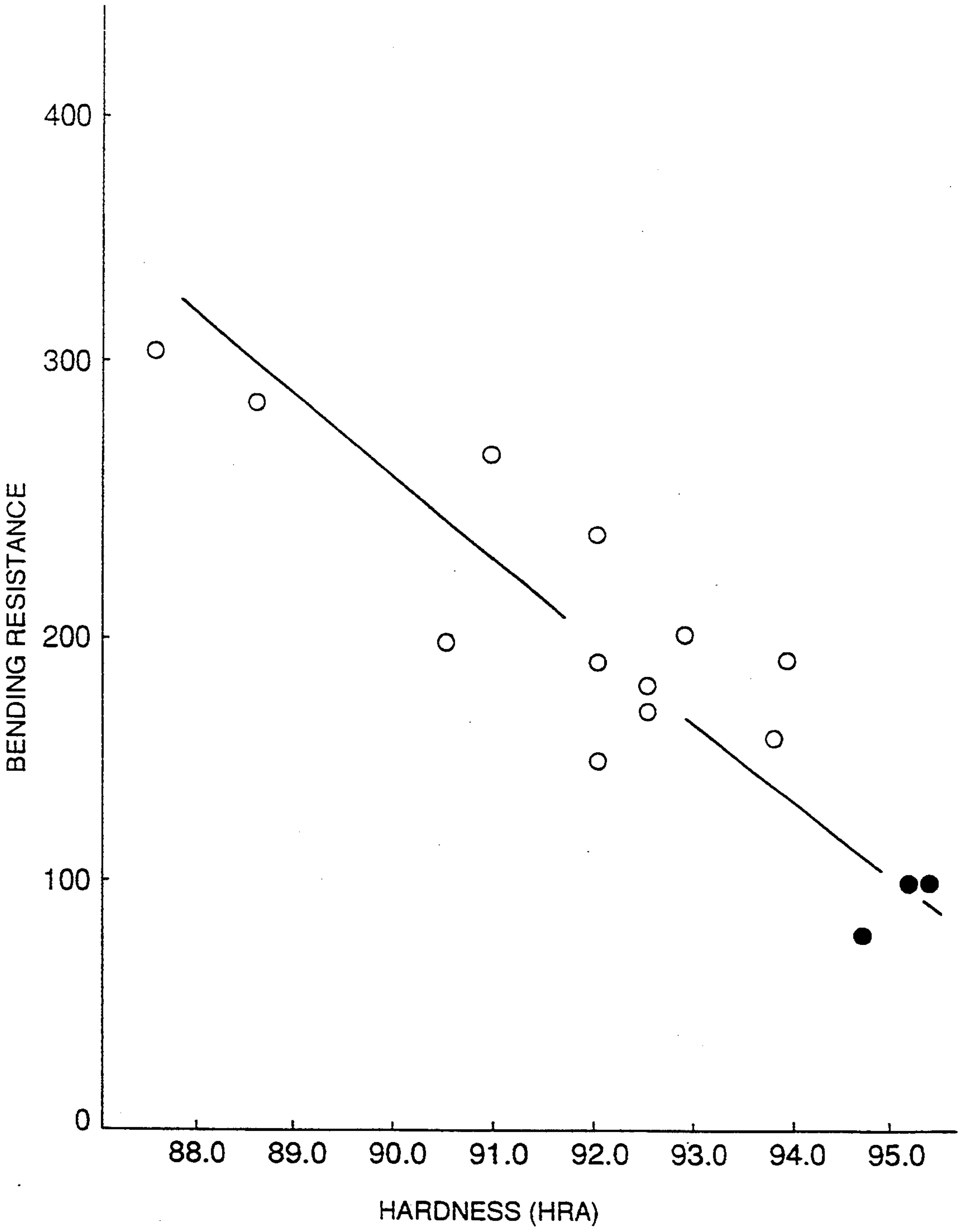
FIG. 3 is a graph representing a relationship between a hardness,of a material and a bending resisting force, i.e. tenacity, according to one embodiment of the present invention and the conventional example.

Data obtained by these experimental tests are shown in FIGS. 2 and 3.

FIG. 2 shows the relationship, with a collision angle $\theta$ of about 15 degrees, between hardnesses (HRA) of various kinds of materials (●: black circles represent the present invention and ◦: white circles represent the conventional technology) and amounts of abrasions (injection pressure: 3500 kgf/cm$^2$, abrasive material: garnet sand #80, supply amount of the garnet sand: 0.4 kg/min.). FIG. 3 shows the relationship between the hardness and the bending resisting force (●: black circles represent the present invention and ◦: white circles represent the conventional technology).

As shown in FIGS. 2 and 3, the bending resisting force, i.e. tenacity, is remarkably degraded in accordance with the increasing of the hardness of the alloy, but the abrasion amount is simply reduced in accordance with the increasing of the alloy hardness resulting in a remarkable improvement of the abrasion proofness or resistance property.

Namely, it was found that the cemented carbon alloy having a high hardness has a more excellent abrasion proof property with respect to the nozzle and the tenacity has not so significant meaning therefor.

This is a new fact which has not been easily assumed from such a phenomenon as that fine particles of abrasive material mixed in the water jet and highly accelerated by the supersonic water jet wears a wall surface in an impulsive manner.

Figure 4:
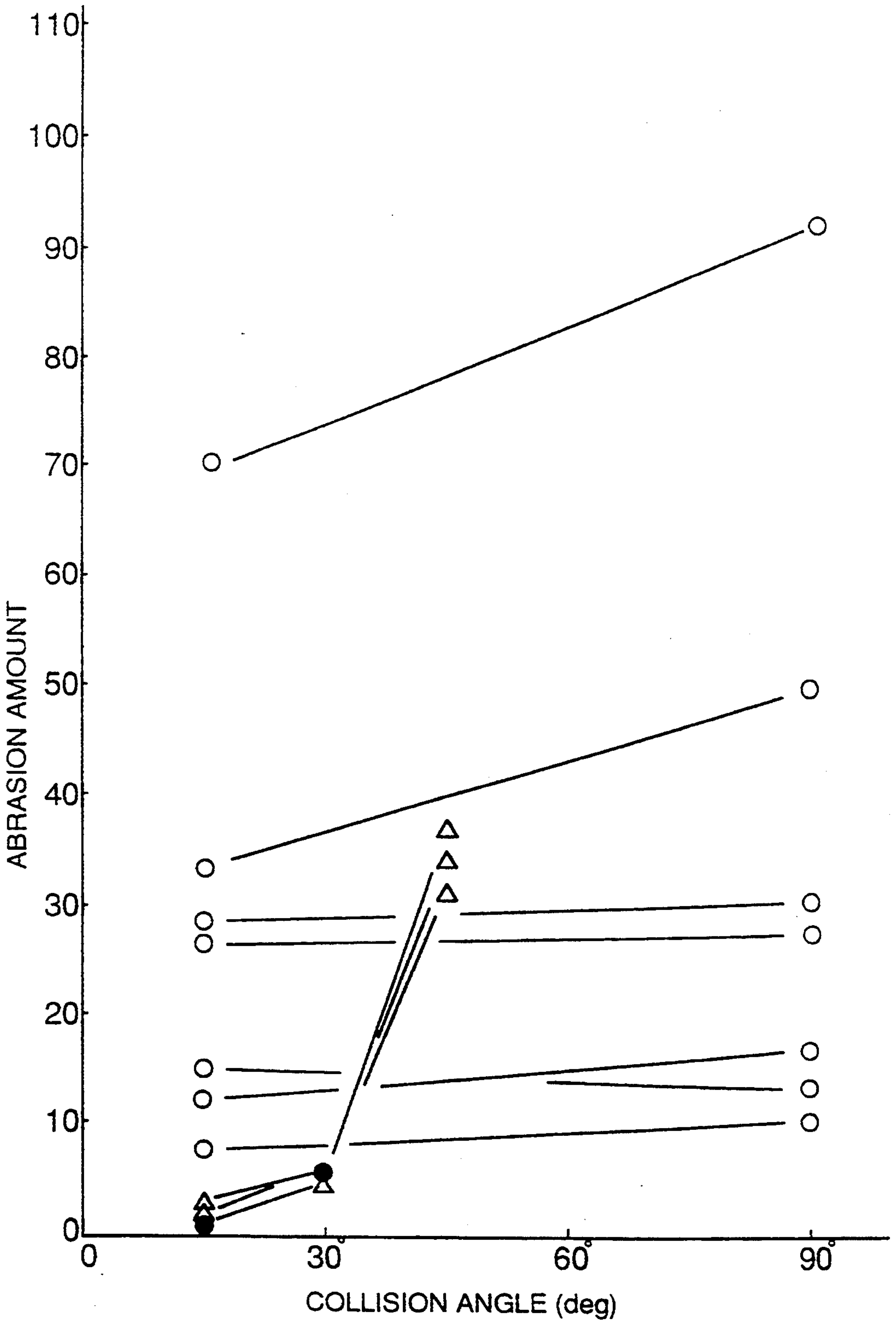
FIG. 4 is a graph showing the relationship between collision angle of particles and an amount of abrasion.

FIG. 4 shows the relationship of the amount of abrasion to the collision angle, which varied variously from about 0" to 900 with respect to the test material (abrasion material: garnet sand #80, supply amount of garnet sand: 0.4 kg/min, injection pressure: 3500 kgf/cm$^2$), and in FIG. 4 ●: black circle represents the alloy material according to the present invention (normal abrasion), Δ: triangle represents the alloy material according to the present invention (abnormal abrasion) and ◦: white circle represents the alloy material of prior art. According to this graph of FIG. 4, it will be found that, in a case where the alloy material has a certain extent of hardness (HRA 94.5 in FIG. 4) and the collision angle increases over 15 to 30 degrees, the abrasion mode is transferred from a stationary state to a non-continuous and brittle abrasion mode, and the amount of abrasion is increased.

Namely, it was made clear that the preferred abrasion proof property naturally provided for the alloy formed of a material having high hardness cannot be attained unless the nozzle is designed so that the collision angle of the fine particles of the abrasive material is within about $\pm$150 in the nozzle. This is extremely important in the design of the nozzle inlet portion.

In the described analysis based on the experimental tests, it was found that a working nozzle having high abrasion proof or resistance property such as a nozzle for the abrasive water jet should be designed in the combination of the hardness and the tenacity of the cemented carbon alloy material so as to have a high hardness and low tenacity in comparison with that of the prior art (although it is desired to have high tenacity, in practical, the bending resisting force, i.e. tenacity, on the contrary, tends to be lowered as the hardness is increased). Furthermore, the nozzle should be designed so as to minimize the collision angle of the fine grains or particles of the abrasive material.

(Basic Principle of The Invention)

The ground of the composition of the nozzle member for one embodiment of the present invention will be described as follows.

Hardness of Alloy:

Grain Size of WC (tungsten carbide):

In general, when cemented carbon alloys have binding phases of the same amount, the WC is formed of fine uniform grains and a hardness of certain extent can be obtained. In an experimental result, it was found that in order to obtain a stable hardness of more than HRA 94.5, it is necessary to use a material having grain diameter of WC being less than 1.0 $\mu$m.

Addition of Different Kind of Carbide (or Metal):

In general, a different kind of carbide is added so as not to grow the WC into grain state during the sintering process thereof. As seen in the present invention, in which the WC has a grain size, there is not included a different kind of carbide and has low amount of binding material at less than 2.05 the suitable sintering temperature is about 1650° C., and under this condition, when the sintering process is carried out, the fine grains of the WC grow into coarse large grains and obtaining no predetermined hardness.

Furthermore, in the case of a composition of only WC and the binding phase, it is known from conventional experiments that a width of a soundness phase area (C %) is made small and there is a possibility of causing a harmful phase ($\eta$ phase, free carbon) adversely affecting on the mechanical strength. Accordingly, because of these reasons, it was found to be effective to suppress the growth of the WC grain and to widen the width of the soundness phase area (C %) by adding one, two or more kinds of carbides such as Ti, Ta, V, Cr, Nb, Mo, Hf, and Zr, or solid solutions of carbides (or metals forming the solid solution).

It was however also found that the addition of the excessive amount of these materials adversely resulted in the lowering of the tenacity, bending resisting force, elastic coefficient and the like.

From the experimental data, it was found that the addition of a different kind of carbide (and metal) of more than 0.5% is inevitably necessary, along with the addition of the amount of about 10% is its upper limit from the viewpoint of the tenacity of the cemented carbide alloy for the anti-erosion-abrasive property.

Binding Phase:

In the case of WCs having the same grain size, an alloy is made hard and brittle as the amount of the binding phase decreases.

In the experimental data, it was found that the tenacity of the alloy is made weak under the condition of a binding phase amount of less than 0.2% and the workability is extremely reduced, and on the other hand, an alloy having a high hardness more than the aimed value of more than HRA 94.5 cannot be obtained under the condition of the binding phase of the amount of more than 2.0%.

Adjustment of C amount

In general, in a case of super hard alloys, a composition adjustment is carried out during the mixing of raw powder materials so that the amount of C content is kept within the stoichiometric value. In this case, if the C amount is excessive above the value, free carbon is produced while if the C amount is insufficient compared with the value, $\eta$ phase is created. Thus, this impairs the mechanical properties of the material. However, by setting the C amount of the super hard alloy slightly lower than the stoichiometric value, improved durability to abrasion has been confirmed experimentally.

Figure 16:
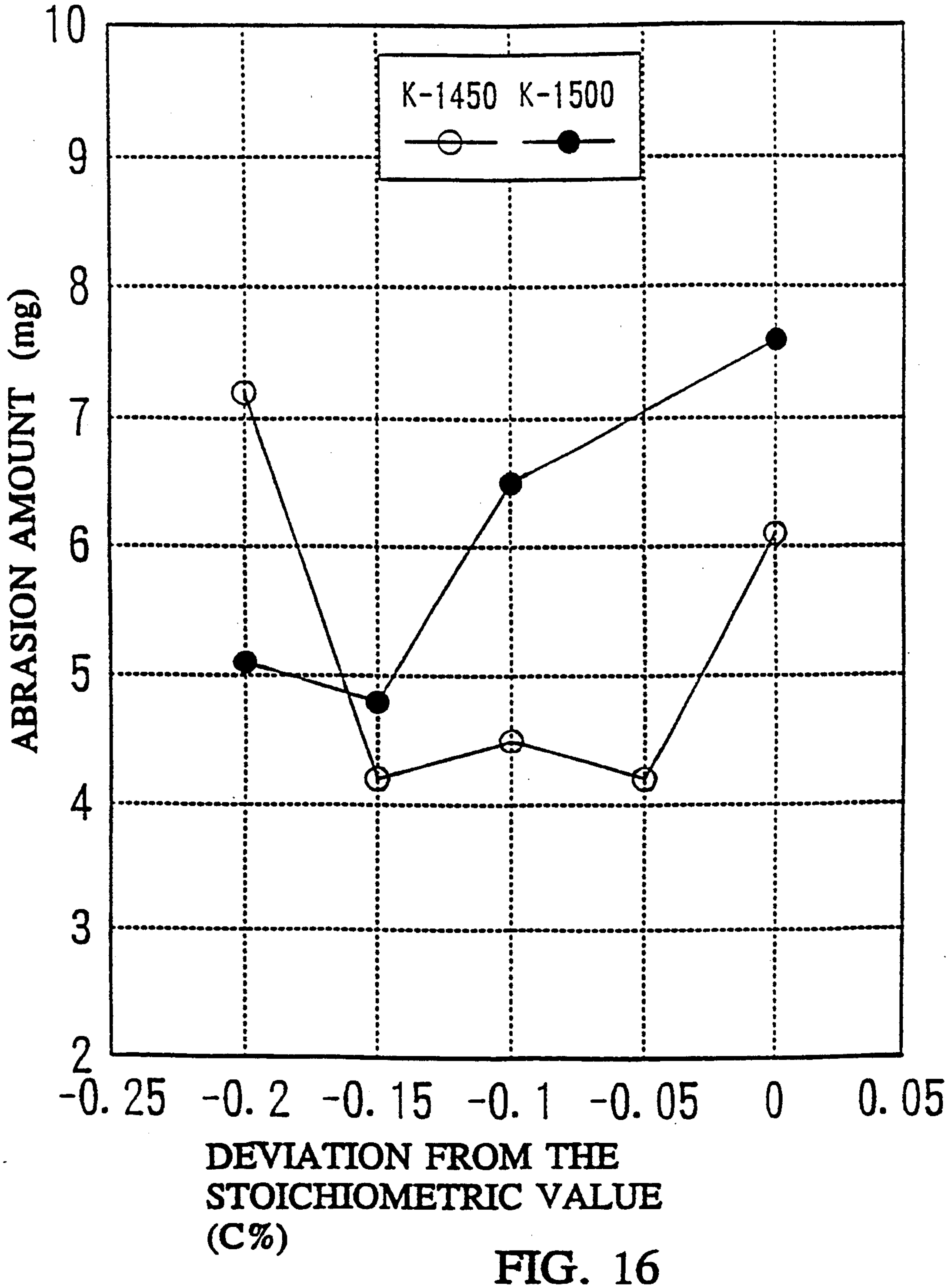
FIG. 16 shows injection abrasion conditions during nozzle jet wear tests.

FIG. 16 indicates the abrasion amount during nozzle jet wear tests when the C amount of the super hard alloy of the nozzle is increased beyond or decreased from the stoichiometric value which corresponds to deviation 0 from the theoretical value in FIG. 16. The jet wear (abrasion) tests were carried out using the device (model) as shown in FIG. 1. The injection abrasion conditions for the jet wear tests were—injection pressure: 2000 kgf/c$^2$, injection angle: 15°, injection time: 180 sec and abrasion material supply amount: 0.4 kg/min. The results of the wear tests prove that as the C amount of the super hard alloy becomes lower than the stoichiometric value, improved abrasion endurance results were obtained. However, when the C amount goes below 0.15 weight % from the stoichiometric value, the abrasion amount is conversely increased, due to inadequate sintering. Consequently, by setting the C amount on the lower C side in the range of no more than 0.15 weight % from the stoichiometric value, the abrasion endurance of the super hard alloy can be improved.

Figure 5:
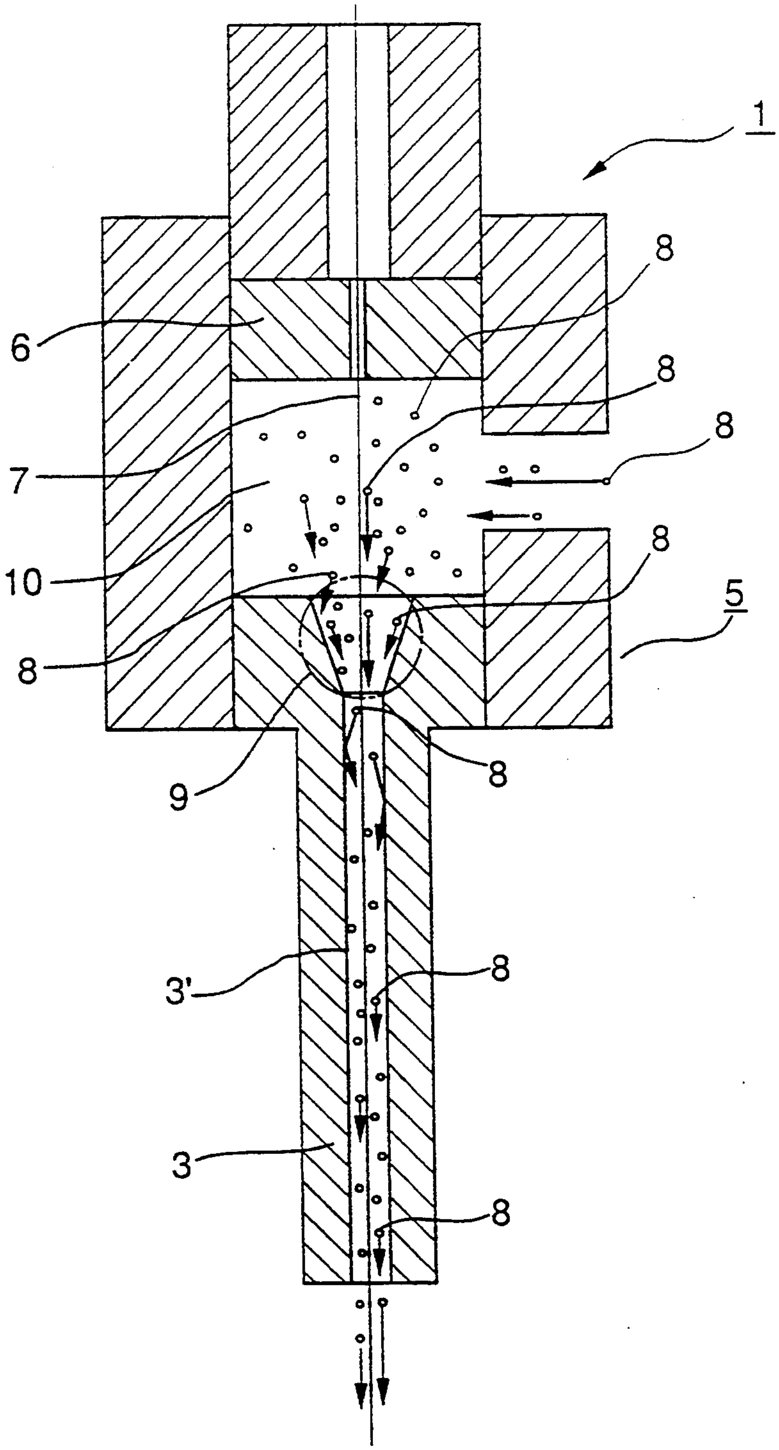
FIG. 5 is a brief sectional view showing a behavior of abrasive grains in an abrasive water jet nozzle 5 member.

Shape of Nozzle:

FIG. 5 is a view for explaining the behavior of the abrasive material in a nozzle head of an abrasive water jet nozzle, in which like reference numerals are added to parts or members corresponding to those shown in FIG. 1 and the description thereof is now omitted.

A nozzle member 5 for the abrasive water jet is provided with an inlet mouth portion 9 having a funnel shape for smoothly guiding, into the abrasive nozzle, abrasive grains 8 sucked into a mixing chamber 10 by the injection of the water jet 7. The inlet mouth portion 9 is subjected to the abrasion by the collision and the grinding of the abrasive grains 8 flown into the abrasive nozzle 3 together with air and the abrasive grains 8 repulsed by the supersonic water jet 7 near the axis of the nozzle.

Particularly, the grains 8 repulsed and accelerated by the water jet collide with high speed against the wall of the mouth portion 9 cause remarkable abrasion to the wall.

It will be seen from FIG. 4 that the abrasion of the mouth portion 9 is facilitated as the inclination of the furnace-shaped wall surface of the mouth portion 9 becomes large and the hardness of the nozzle material increases.

Accordingly, in the viewpoint of the abrasion of the nozzle, it will be desired for the mouth portion 9 to have a surface having less inclination with respect to the axis of the nozzle, and for example, in view of the results of FIG. 4, it will be necessary to design the mouth portion so as to have an inclination to be within about ±15° (which however varies in accordance with various conditions).

In the meantime, in the inside of the nozzle, the abrasive grains mixed in the water jet are accelerated, as shown in FIG. 5, while repeating the repulsion between the water jet and—the wall surface 3' of the abrasive nozzle 3, and the flow of the abrasive grains 8 is rectified to be parallel to the wall surface 3' while flowing downwardly through the abrasive nozzle 3. However, since the inner wall surface 3' of the abrasive nozzle 3 is made substantially parallel to the axis of the water jet, the abrasive grains 8 essentially collide against the wall surface 3' at a small angle, thus seldom causing abnormal abrasion. This fact was based on the experiment.

As described above, a remarkable improvement in the durability can be achieved by the effective combination of the material having a high hardness and its abrasive property attaining the excellent abrasion proof or resistance property against the collision with small angle and the characteristic feature of the nozzle abrasion caused by the essentially small angle collision.

(Embodiments)

Preferred embodiments according to the present invention will be described hereunder.

The following Table 1 (See attached) shows the characteristic features of the cemented carbon alloys as the material for the abrasive water jet nozzle according to the present invention in comparison with the conventional ones with reference to the hardness (HRA), the bending resisting force (kgf/mm$^2$), and the amount (mg) of abrasion based on the abrasion tests (pressure: 3500 kgf/cm$^2$; abrasive material: garnet sand; injection time: 15 sec.).

In the Table 1:

Amount of Abrasion: Weight reduction amount (mg) of the material under the predetermined injection abrasion conditions.

Injection abrasion conditions:

Injection pressure: 3500 kgf/cm$^2$

Injection Time: 15 sec.

Abrasion Material: Garnet Sand #80

Abrasion Material Supply Amount: 0.4 kg/min.

From the above Table 1, it will be found that the material of the alloy according to the present invention shows improved abrasion proof property and the durability about four times in comparison with the material of the conventional alloy.

The alloy of the above embodiment was manufactured in the following manner.

First, the Co (1%) having a grain diameter of 1.5 μm, TiC (4.5%) having a grain diameter of 1.5 μm and different kind of carbide (1.5%) having a grain diameter of 1.5 μm were mixed with the WC (tungsten carbide) having a grain diameter of 1.0 μm. Here, a mixing rate of the powder material of the super hard alloy is adjusted so that after the sintering the amount of C content is on the lower C side of the range of no more than 0.15 weight % from the stoichiometric value. The mixture was mixed by a wet blending operation in a ball mill for 72 hours in the presence of alcohol and then dried. After drying, the dried powder was pressed by means of a press with a pressure of 1000 kgf/cm$^2$ and then preliminarily sintered in a vacuum condition at a temperature of 800° C. The sintering process was carried out with the vacuum degree of 0.1 to 10 Torr and under the condition of 1600° C.—60 min, and then, HIP (high temperature isotropic pressure) treatment was carried out with the use of Ar gas under the condition of 1450° C.—60 min.

Figure 6:
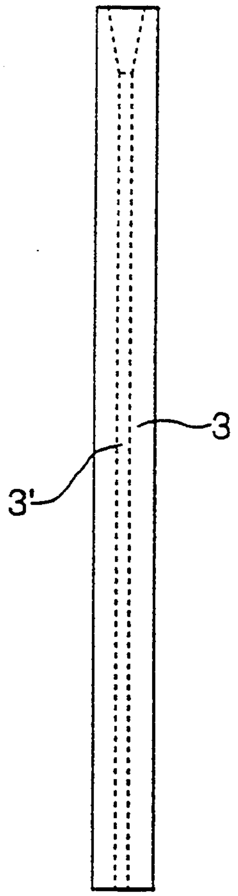
FIGS. 6 and 7 are examples of the abrasive water jet nozzle members manufactured according to the embodiments of the present invention.
Figure 7:
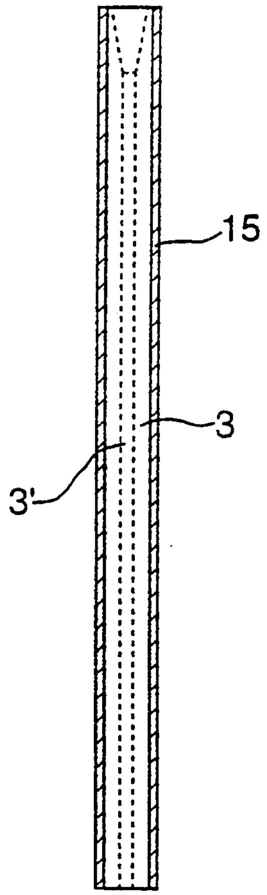
Figure 8:
FIGS. 8 and 9 are plan views of the examples of 10 FIGS. 6 and 7.
Figure 9:

FIG. 6 shows one example of the nozzle member for the abrasive water jet manufactured by the alloy according to the present invention and FIG. 7 shows a modified example thereof in which a metallic shielding tube is applied to the outer peripheral surface of the nozzle member of FIG. 6 for the purpose of reinforcing and easily finishing the outer peripheral surface of the nozzle member. FIGS. 8 and 9 show plan views of the example of FIGS. 6 and 7.

Figure 10:
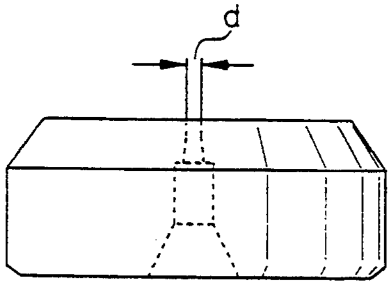
FIGS. 10 and 11 are side views of examples of water nozzles (orifices) manufactured according to the present invention.
Figure 11:
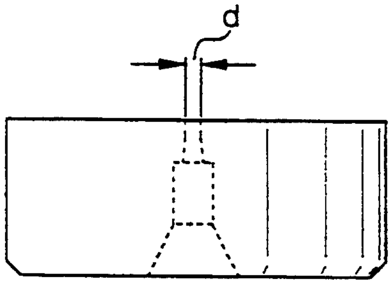

FIGS. 10 and 11 show side views of water nozzle (orifice having 0.05–0.5 mm in diameter (d)) members for the abrasive water jet manufactured by the alloy according to the present invention.

As described hereinbefore, the basic feature of the present invention resides in the design setting of the combination of the hardness and the tenacity of the alloy composition to the high hardness level and low tenacity area in comparison with those of the prior art.

The present invention may be applied to a nozzle member having a front tapered nozzle end or square nozzle hole.

In the foregoing embodiment of the present invention, a certain extent of the binding phase is added for achieving the improved workability and the sintering performance. In this embodiment, however, it is difficult to obtain the possibly maximum hardness and abrasion proof property, and accordingly, there still remains a problem of the durability.

There has been also commercially provided, as a specific sintered material, so-called a binder-less alloy such as WC-TaC-TiC alloy composed of a hard substance including no Co for improving anti-corrosion property. However, such sintered material alloy includes no binding phase, so that the hardness naturally increases and an alloy having the HRA 93.5 or near has been utilized for a mechanical seal or the like.

In view of the above, an aspect of another embodiment of the present invention will be described hereunder.

As described hereinbefore, as a significant cause for the severe abrasion to a nozzle, such as abrasive water jet nozzle, for cut working operation, there will be pointed out the erosion of a material for the nozzle due to abrasive particles such as the garnet sand contained in the water jet. In order to clarify the erosion characteristics of the hard material for the present invention as well as technology for this art of field, an abrasion test method for realizing abrasion condition in the abrasive water jet nozzle (super high pressure jet abrasion test) was conceived and experiments and adjustments were carried out for clarifying the characteristic features of the various kinds of hard materials including test alloys.

These tests were carried out by utilizing the water jet injection mode shown in FIG. 1.

Figure 12:
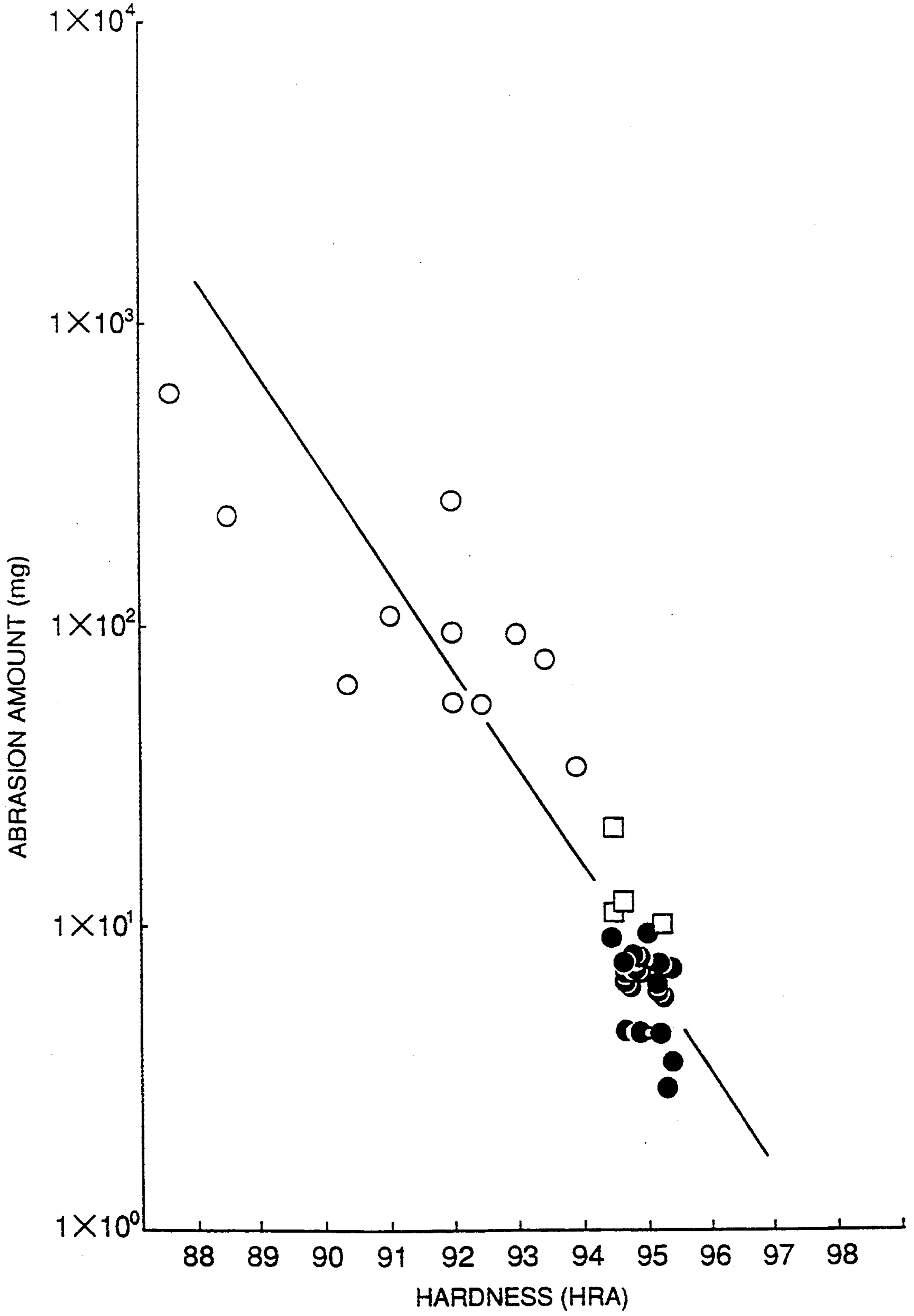
FIGS. 12 and 13 are graphs similar to those of FIGS. 2 and 3, respectively, according to another embodiment of the present invention.
Figure 13:
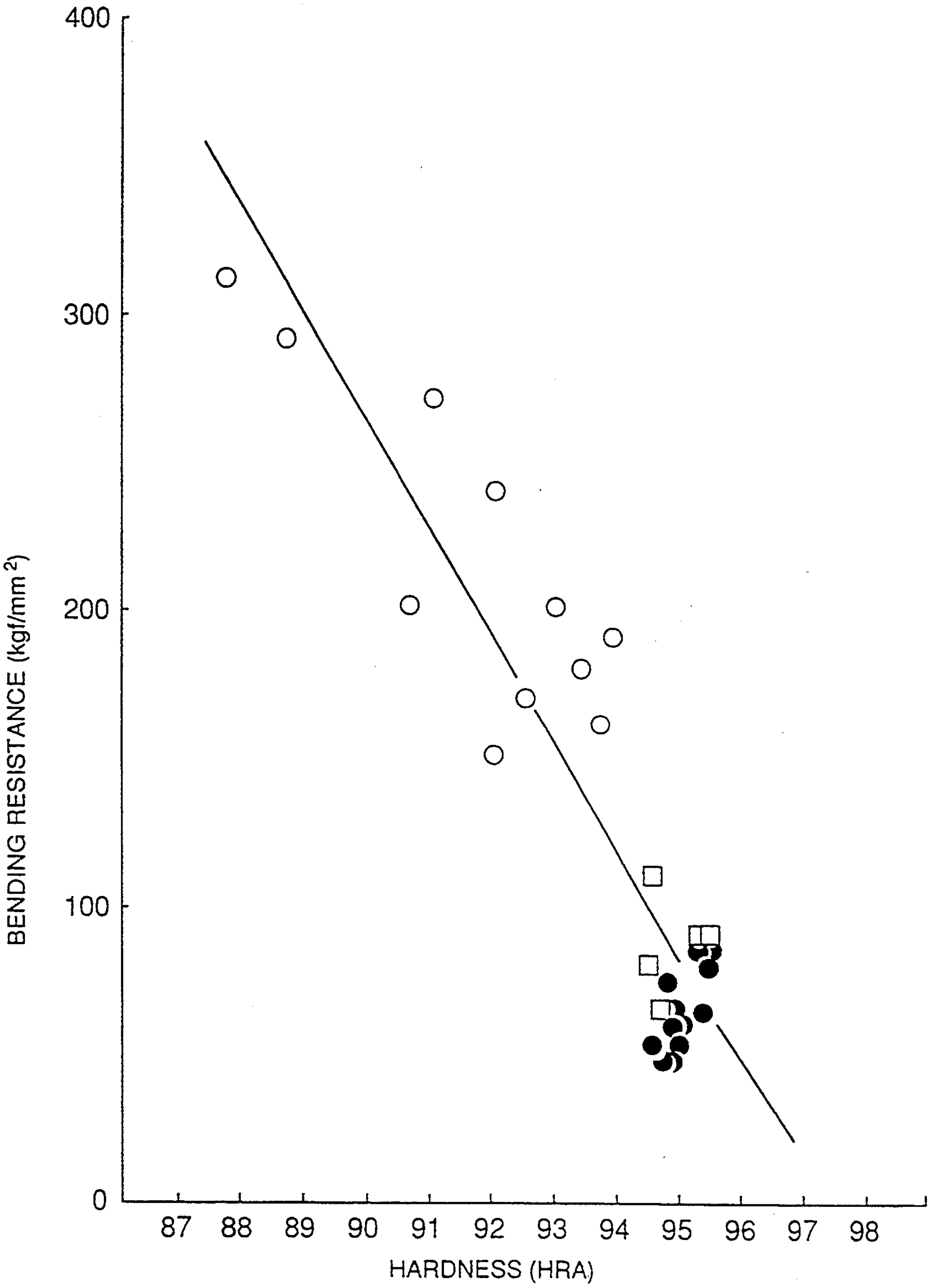

Data obtained by these experimental tests are shown in FIGS. 12 and 13.

FIG. 12 shows the relationship, with a collision angle $\theta$ of about 15 degrees of the water jet including the garnet sand with respect to # a work, between hardnesses of various kinds of materials (●: black circles represent the present embodiment, ○: white circles represent the conventional technology and D: square represent the former embodiment) and amounts of abrasions (injection pressure: 2000 kgf/cm$^2$, abrasive material: garnet sand #80, supply amount of the garnet sand: 0.4 kg/min.). FIG. 13 shows the relationship between the hardness and the bending resist force (●: black circles represent the present embodiment, ○: white circles represent the conventional technology and □: white square represent the former embodiment).

As shown in FIGS. 12 and 13, the bending resisting force, i.e. tenacity is remarkably degraded in accordance with the increasing of the hardness of the alloy, but the abrasion amount is simply reduced in accordance with the increasing of the alloy hardness, resulting in the remarkable improvement of the abrasion proof or resistance property.

Namely, it was found that a better abrasion proof property could be obtained by a material mainly including a carbide having a high hardness as possibly and the tenacity has not so significant meaning for cutting tools and mechanical seals.

This is a new fact which has not been easily assumed from such a phenomenon as that fine particles of abrasive material mixed in the water jet and highly accelerated by the supersonic water jet wears a wall surface in an impulsive manner.

In the analysis based on the experimental tests, it was found that the working nozzle having high abrasion proof or resistance property such as a nozzle for the abrasive water jet should be designed in the combination of the hardness and the tenacity of the hard material so as to have high hardness and low tenacity in comparison with that of the prior art (although it is desired to have high tenacity, in practical, the bending resisting force, i.e. tenacity, on the contrary, tends to be lowered as the hardness is increased). Furthermore, the nozzle should be designed so as to minimize the collision angle of the fine grains or particles of the abrasive material.

The ground of the composition of the nozzle member for the present embodiment will be described as follows.

A method for obtaining an object hardness of a material is described with respect to the following views.

Binding Phase:

The hardness and the abrasion proof property are increased in accordance with the reduction of the amount of the binding phase as far as tungsten carbides includes particles having the same diameter. In this viewpoint, in this embodiment, the development of the hard materials of the present invention has been carried out on the assumption of no inclusion of the binding phase as the limit of this fact.

This condition is significantly different from the foregoing embodiment. However, since a sintered material having the aimed hardness and the abrasion proof property is hardly obtained by merely including no binding phase, the following means and method are realized for the purpose described above.

Grain Degree of Tungsten Carbide (WC):

In general, when hard sintered materials of tungsten series carbon (WC) have binding phases of the same amount, there is a high hardness and abrasion proof property in accordance with the uniformity of the grain sizes. In the case of the hard material including no binding phase as in the present embodiment, it was found that in order to obtain a stable hardness of more than HRA 94.5, it is necessary to use a material having grain diameter of WC being less than 1.0 $\mu$m.

Addition of Different Kind of Carbide:

With respect to the alloy of the, present embodiment in which the WC is composed of fine grains and includes no binding phase, a suitable sintering temperature is of about 1700° C. When the sintering process is carried out under this state, the grains of the WC grow into large coarse grains, and hence, the desired hardness and abrasion proof property cannot be obtained.

In this regards, in various trial and error tests, it was found to be effective that the growth of the WC grain is suppressed and the sintering temperature is made lower by adding one, two or more kinds of carbides (or nitride) such as Ti, Ta, V, Cr, Nb, Mo, Hf, and Zr (or N), or solid solutions of carbides (or solid solution of nitrides).

It was however also found from the experimental data that the addition of the excessive amount of these materials adversely affects on the abrasion proof property, and according to the present invention, the addition of different carbide or nitride of about 10% is the limit to this addition.

According to the above-described means or method, or as occasion demands, by commonly utilizing HIP (high temperature isotropic pressure) means during the sintering process or after the sintering process, a hard material having extremely superior abrasion proof property can be manufactured as a high pressure nozzle material for the abrasive water jet.

The behavior of the abrasive materials, i.e. abrasive grains, is shown in FIG. 5 as described with reference to the former embodiment.

An actually performed embodiment will be described hereunder.

The following Table 2 (See attached) shows the characteristic features of the nozzle material for the abrasive water jet according to the present embodiment in comparison with the conventional ones and the former embodiment with reference to the hardness (HRA), the bending resisting force (kgf/mm$^2$), and the amount (mg) of abrasion based on the abrasion tests (pressure: 2000 kgf/cm$^2$; abrasive material: garnet sand; injection time: 180 sec.).

In the Table 2:

Amount of Abrasion: Weight reduction amount (mg) of the material under the predetermined injection abrasion conditions.

Injection abrasion conditions:

Injection pressure: 2000 kgf/cm$^2$

Injection Time: 180 sec.

Abrasion Material: Garnet Sand #80

Abrasion Material Supply Amount: 0.4 kg/min.

From the above Table 1, it will be found that the material of the alloy according to the present embodiment shows improved abrasion proof property and the durability about two times in comparison with the former embodiment.

The alloys of the above embodiments (1 to 10 in Table 2) were manufactured in the following manner.

First, a different kind of carbide having a grain diameter of less than 1.5 $\mu$m was mixed with WC having a grain diameter of less than 1.0 $\mu$m. The mixture was mixed by wet blending operation in a ball mill for 72 hours in the presence of alcohol and then dried. After the drying, the dried powder was pressed by means of a press with a pressure of 1000 kgf/cm$^2$ and then preliminarily sintered in a vacuum condition at a temperature of 800° C.

The sintering process was carried out with a vacuum degree of 0.1 to 10 Torr and under the condition of 1500° C.—60 min and 1500 kgf/cm$^2$ and then the HIP treatment was carried out in the atmosphere of Ar gas.

The alloys of the above embodiments (11 to 20 in Table 2) were manufactured in the following manner.

First, the different kind of carbide having a grain diameter of less than 1.5 $\mu$m and nitride (10 weight parts) was mixed with the WC having a grain diameter of less than 1.0 $\mu$m. The mixture was mixed by wet blending operation in a ball mill for 72 hours in the presence of alcohol and then dried. After the drying, the dried powder was pressed by means of a press with a pressure of 1000 kgf/cm$^2$ and then preliminarily sintered in a vacuum condition at a temperature of 800° C.

The sintering process was carried out while releasing the vacuum condition and adding the nitrogen gas to establish the pressure of 20 to 150 Torr under the condition of 1500° C.—60 min and 1500 kgf/cm$^2$ and then, the HIP treatment was carried out in the atmosphere of Ar gas.

It is to be noted that examples of the nozzle member for the abrasive water jet manufactured according to the present embodiment have the shape and configuration such as shown in FIGS. 6 to 11.

A further embodiment according to the present invention will be described hereunder with respect to a nozzle member for an abrasive water jet manufactured from a high abrasion proof hard sintered material under the presence of a binding phase.

As described hereinbefore, as significant causes for the severe abrasion to a nozzle, such as abrasive water jet nozzle in the case of cut working operation, there is the erosion of a material for the nozzle due to abrasive particles such as the garnet sand contained in the water jet. In order to further improve the erosion characteristics of the hard material due to the abrasive grain, an abrasion test method for realizing abrasion condition in the abrasive water jet nozzle (super high pressure jet abrasion test) was conceived and experiments and adjustments were carried out for making clear the characteristic features of the various kinds of hard materials including test alloys.

These tests were carried out by utilizing the water jet injection mode shown in FIG. 1.

Figure 14:
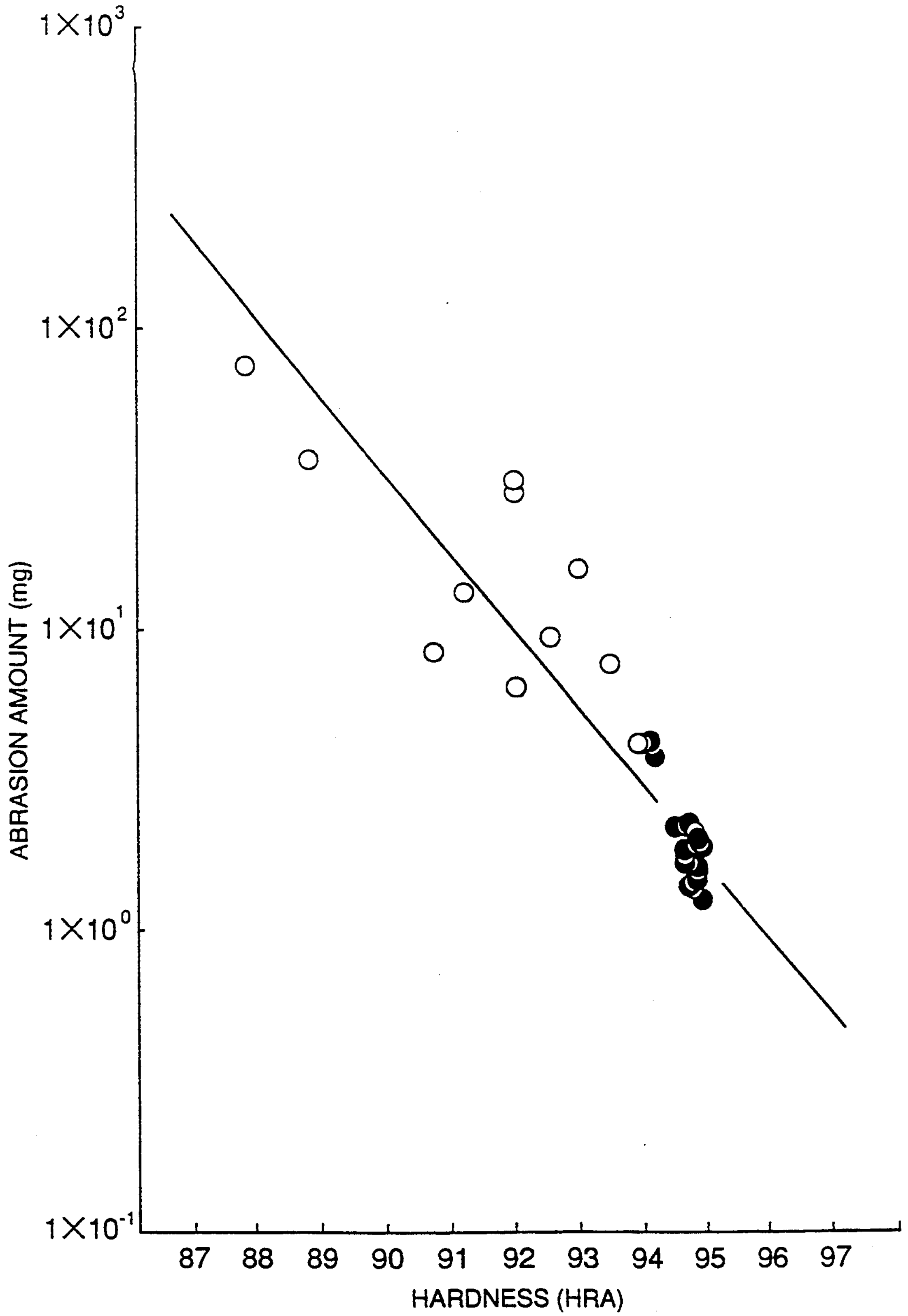
FIGS. 14 and 15 are graphs similar to those of FIGS. 2 and 3, respectively, according to a further embodiment of the present invention.
Figure 15:
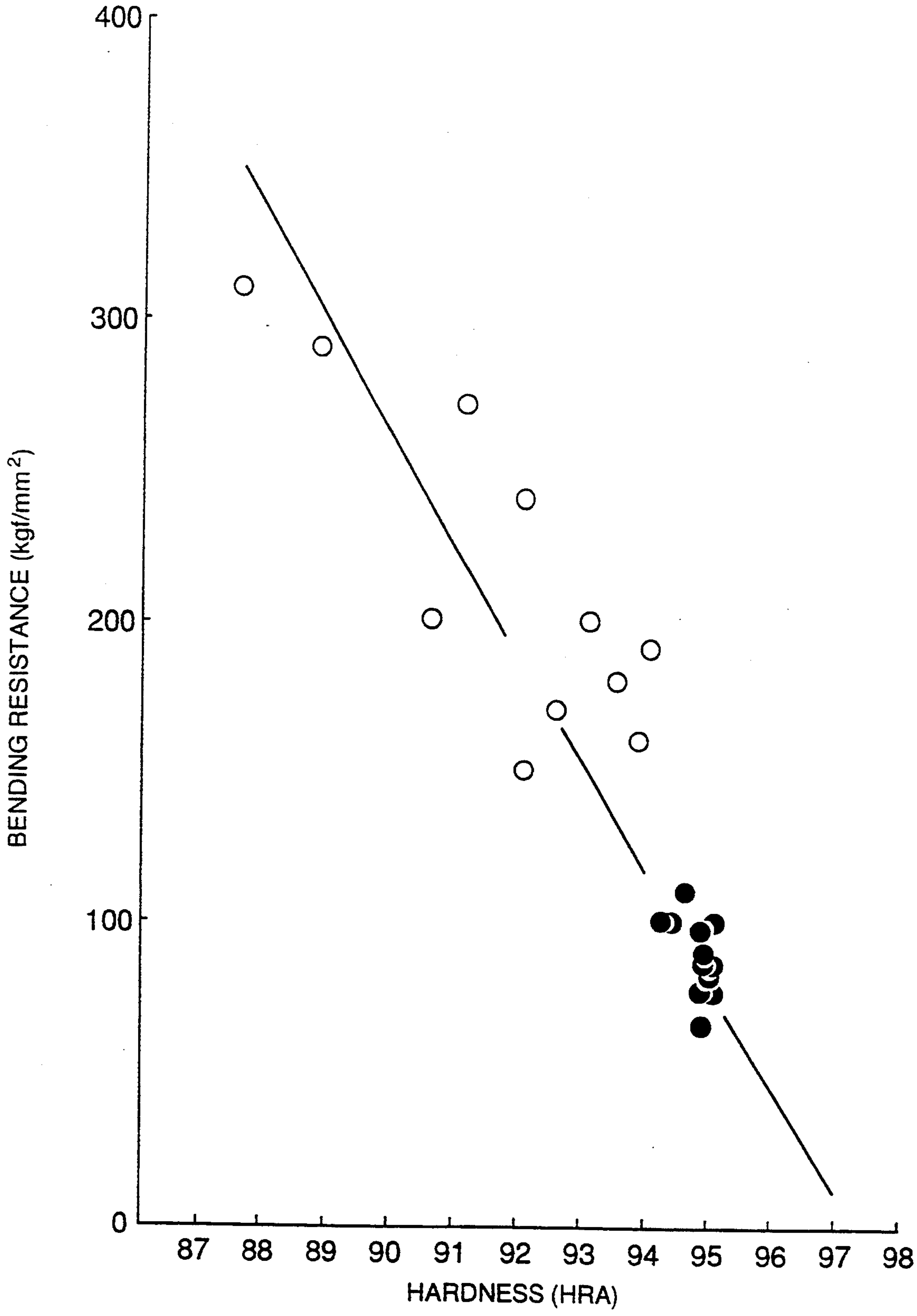

Data obtained by these experimental tests are shown in FIGS. 14 and 15.

FIG. 14 shows the relationship, using a collision angle $\theta$ of about 15 degrees of the water jet including the garnet sand with respect to a work, between hardnesses of various kinds of materials (●: black circles represent the present embodiment and ○: white circles represent the conventional technology) and amounts of abrasions (injection pressure: 3500 kgf/cm$^2$, abrasive material: garnet sand #80, supply amount of the garnet sand: 0.4 kg/min.). FIG. 15 shows the relationship between the hardness and the bending resisting force (●: black circles represent the present embodiment and ○: white circles represent the conventional technology)

As also shown in FIGS. 14 and 15, the bending resisting force, i.e. tenacity is remarkably degraded in accordance with the increasing of the hardness of the alloy, but the abrasion amount is simply reduced in accordance with the increase of the alloy hardness, resulting in the remarkable improvement of the abrasion proof or resistance property.

Namely, it was found that a more excellent abrasion proof property could be obtained by a material mainly including a carbide having a high a hardness as possible, while tenacity has not so significant meaning.

This is a new fact which has not been easily assumed from such a phenomenon as that fine particles of abrasive material mixed in the water jet and highly accelerated by the supersonic water jet wears a wall surface in an impulsive manner.

In the analysis based on the experimental tests, it was found that the working nozzle having high abrasion proof or resistance property such as a nozzle for the abrasive water jet should be designed in the combination of the hardness and the tenacity of the hard material so as to have high hardness and low tenacity in comparison with that of the prior art (although it is desired to have high tenacity, in practical,, the bending resisting force, i.e. tenacity, on the contrary, tends to be lowered as the hardness is increased). Furthermore, the nozzle should be designed so as to minimize the collision angle of the fine grains or particles of the abrasive material.

The ground of the composition of the nozzle member for the present embodiment will be described as follows.

Grain Degree of WC (tungsten carbide):

In general, as far as the same amount of the hard materials is included, a certain extent of high hardness can be obtained with the fine grains of the WCs being uniform, and it was found from the experimental data that it is necessary to use the WC having a grain diameter of less than 1.0 μm in order to obtain a stable hardness of more than HRA 94.0 desired in the industrial field.

Binding Phase:

An alloy is made hard in less amount of binding phase with WCs having the same grain diameter, and it was found that from the experimental data that an aimed hardness more than the HRA 94.0 cannot be obtained in the amount of binding phase of more than 2.0%.

Addition of Different Kind of Carbide (or carbide solid solution, or nitride or nitride solid solution):

In general, a different kind of carbide is added so as not to grow grains of carbide during the sintering process. In this meaning, when the WC is composed of fine grains and includes no different kind of carbide and the amount of the binding phase is less than 2.0%, a suitable sintering temperature is of about 1650° C. However, when the sintering process is carried out under this state, the grains of the WC grow into large coarse grains, and hence, desired hardness cannot be obtained.

Furthermore, in the case of a composition of the WC and the binding phase, the width of, a soundness phase area is small and a harmful phase ($\eta$-phase, free carbon) adversely affecting on the mechanical strength is generated.

In order to avoid such adverse phenomenon, the grain growth of the WC grains is suppressed and the width of the soundness phase area is widened by adding one, two or more kinds of carbides (or nitride) such as Ti, Ta, V, Cr, Nb, Mo, Hf, and Zr (or N), or solid solutions of carbides (or solid solution of nitrides) as occasion demands.

It was however also found from the experimental data that the addition of the excessive amount of these materials adversely affects on the abrasion proof property, and according to the present invention, the addition of different carbide or nitride (or solid solutions thereof) of about 10% is the limit of this addition.

The behavior of the abrasive materials, i.e. abrasive grains, is shown in FIG. 5 as described with reference to the former embodiment.

An actually performed embodiment will be described hereunder.

The following Table 3 (See attached) shows the characteristic features of the nozzle material for the abrasive water jet according to the present embodiment in comparison with the conventional ones with reference to the hardness (HRA), the bending resisting force (kgf/mm$^2$), and the amount (mg) of abrasion based on the abrasion tests (pressure: 3500 kgf/cm$^2$; abrasive material: garnet sand; injection time: 15 sec.).

In the Table 3:

Amount of Abrasion: Weight reduction amount (mg) of the material under the predetermined injection abrasion conditions.

Injection abrasion conditions:

Injection pressure: 3500 kgf/cm$^2$

Injection Time: 15 sec.

Abrasion Material: Garnet Sand #80

Abrasion Material Supply Amount: 0.4 kg/min.

From the above Table 3, it will be found that the material of the alloy according to the present embodiment shows improved abrasion proof property and the durability about four times in comparison with the conventional ones.

The hard sintered materials of the above embodiments (4 to 10 and 12 to 15 in Table 3) were manufactured in the following manner.

First, a different kind of metal carbide having a grain diameter of less than 1.5 μm by weight % of less than 10% was mixed with the WC, as a main component, having a grain diameter of less than 1.0 μm with a binding metal (Co, Ni) having a grain diameter of less than 1.5 μm by weight % of less than 2%. Here, a mixing rate of the powder material of the super hard alloy is adjusted so that after the sintering the amount of C content is on the lower C side of the range of not more than 1.15 weight % from the stoichiometric value. The mixture was mixed by a wet blending operation in a ball mill for 72 hours in the presence of alcohol and then dried. After drying, the dried powder was pressed by means of a press with a pressure of 1000 kgf/cm$^2$ and preliminarily sintered in a vacuum condition at a temperature of 800° C.

The sintering process was carried out with a vacuum degree of 0.1 to 10 Torr and under the condition of 1600° C.—60 min and then, the HIP treatment was carried out in the atmosphere of Ar gas.

The hard sintered material of the above embodiment (11 in Table 3) was manufactured in the following manner.

First, a solid solution of Ti (C, N) having a grain diameter of 1.5 μm by weight % of 5.7% with a binding metal having a grain diameter of less than 1.5 μm by Co weight % of 1% was mixed with the WC, as main component, having a grain diameter of less than 1.0 μm. Here, a mixing rate of the powder material of the super hard alloy is adjusted so that after the sintering the amount of C content is on the lower C side of the range of not more than 1.15 weight % from the stoichiometric value. The mixture was mixed by a wet blending operation in a ball mill for 72 hours in the presence of alcohol and then dried. After drying, the dried powder was pressed by means of a press with a pressure of 1000 $kgf/cm^2$ and then preliminarily sintered in a vacuum condition at a temperature of 800° C.

The sintering process was carried out while releasing the vacuum condition and adding the nitrogen gas to establish the pressure of 20 to 150 Torr under the condition of 1600° C.—60 min, and then, the HIP treatment was carried out in the atmosphere of Ar gas.

It is to be noted that examples of the nozzle member for the abrasive water jet manufactured according to the present embodiment have the shape and configuration such as shown in FIGS. 6 to 11.

According to the embodiments of the present invention described above, there is provided a high pressure injection nozzle member having an improved abrasion proof property and the durability.

It is to be understood that the present invention is not limited to the described embodiments and many other changes and modifications may be made without departing from the scope of the appended claims.

TABLE 1

| | TEST MATERIAL No. | WC GRAIN DIAMETER (μm) | COMPOSITION (wt %) Co | Ni | TiC | VC | Cr3C2 | Mo2C |
|---|---|---|---|---|---|---|---|---|
| CONVENTIONAL | 1 | 2.0 | 13 | — | — | — | — | — |
| MATERIAL | 2 | 1.0 | 10 | — | — | — | — | — |
| | 3 | 1.0 | 4 | — | 1 | — | — | — |
| ALLOY OF | 4 | 1.0 | 1 | — | 4.5 | 1 | — | — |
| PRESENT | 5 | 1.0 | 1 | — | 3 | 2 | — | 2 |
| INVENTION | 6 | 1.0 | 1 | — | 2 | 1 | 1 | — |
| | 7 | 1.0 | 1 | 1 | 4.5 | 1 | — | — |
| | 8 | 1.0 | 1 | — | — | 2 | — | 1 |
| | 9 | 1.0 | 0.5 | — | — | 1 | 1 | — |
| | 10 | 1.0 | 0.5 | 0.5 | — | 2 | 1 | — |
| | 11 | 1.0 | 2 | — | 4.5 | 1 | — | — |

| | TEST MATERIAL | COMPOSITION (wt %) TaC | HfC | HARDNESS (HRA) | BENDING RESISTANCE ($kgf/mm^2$) | ABRASION AMOUNT (mg) |
|---|---|---|---|---|---|---|
| CONVENTIONAL | 1 | — | — | 87.5 | 310 | 72 |
| MATERIAL | 2 | — | — | 91.0 | 270 | 13 |
| | 3 | — | — | 93.5 | 180 | 8 |
| ALLOY OF | 4 | — | — | 95.3 | 90 | 2 |
| PRESENT | 5 | — | — | 95.4 | 80 | 2 |
| INVENTION | 6 | 1 | 1 | 95.2 | 70 | 2 |
| | 7 | — | — | 94.6 | 100 | 3 |
| | 8 | — | 1 | 95.1 | 80 | 2 |
| | 9 | — | — | 95.3 | 70 | 2 |
| | 10 | — | — | 95.0 | 90 | 2 |
| | 11 | — | — | 95.0 | 110 | 2 |

TABLE 2

| | TEST MATERIAL No. | COMPOSITION (wt %) Ti | Zr | Hf | V | Nb | Ta | Cr | Mo | Co | C | N | W |
|---|---|---|---|---|---|---|---|---|---|---|---|---|---|
| MATERIAL | 1 | 3.0 | | | 2.0 | | | | | | 6.97 | | BAL. |
| OF ANOTHER | 2 | | | | 2.0 | | 5.0 | | | | 6.46 | | BAL. |
| EMBODIMENT | 3 | 3.0 | | | 2.0 | | | 1.0 | | | 7.06 | | BAL. |
| OF PRESENT | 4 | 3.0 | | | 2.0 | | | | 1.0 | | 6.97 | | BAL. |
| INVENTION | 5 | | | 1.0 | 2.0 | | 2.0 | 1.0 | 1.0 | | 6.53 | | BAL. |
| | 6 | | 1.0 | | 2.0 | 2.0 | | 1.0 | 1.0 | | 6.71 | | BAL. |
| | 7 | 3.0 | | | 2.0 | | | | | | 6.97 | | BAL. |
| | 8 | 3.0 | | | 2.0 | | | | 1.0 | | 6.97 | | BAL. |
| | 9 | | 1.0 | | 2.0 | 2.0 | | 1.0 | 1.0 | | 6.71 | | BAL. |
| | 10 | | | | | | | | 5.0 | | 6.11 | | BAL. |
| | 11 | 3.0 | | | 2.0 | | | | | | 6.60 | 0.56 | BAL. |
| | 12 | 3.0 | | | 2.0 | | | 1.0 | | | 6.68 | 0.56 | BAL. |
| | 13 | 3.0 | 2.0 | | 2.0 | | | 1.0 | | | 6.80 | 0.56 | BAL. |
| | 14 | 3.0 | | 2.0 | 2.0 | | | 1.0 | | | 6.68 | 0.56 | BAL. |
| | 15 | 3.0 | | | 2.0 | 2.0 | | 1.0 | | | 6.80 | 0.56 | BAL. |
| | 16 | 3.0 | | | 2.0 | | 2.0 | 1.0 | | | 6.68 | 0.56 | BAL. |
| | 17 | 3.0 | | | 2.0 | | | 1.0 | 2.0 | | 6.67 | 0.56 | BAL. |
| | 18 | 3.0 | | | 2.0 | | 2.0 | 1.0 | 1.0 | | 6.68 | 0.56 | BAL. |
| | 19 | 3.0 | | 1.0 | 2.0 | | 2.0 | 1.0 | 1.0 | | 6.68 | 0.56 | BAL. |
| | 20 | | 1.0 | | 2.0 | 2.0 | | 1.0 | 1.0 | | 6.70 | 0.15 | BAL. |

TABLE 2-continued

| | | | | | | | | | | | | | |
|---|---|---|---|---|---|---|---|---|---|---|---|---|---|
| CONVENTIONAL MATERIAL | 1 | | | | | | | | | 13.0 | 5.33 | | BAL. |
| | 2 | | | | | | | | | 10.0 | 5.52 | | BAL. |
| | 3 | 1.0 | | | 1.0 | | | | | 4.0 | 6.05 | | BAL. |
| MATERIAL OF ONE EMBODIMENT OF PRESENT INVENTION | 1 | 2.0 | | 1.0 | 1.0 | | 1.0 | 1.0 | | 1.0 | 6.66 | | BAL. |
| | 2 | 4.5 | | | | | | | | 2.0 | 6.95 | | BAL. |

| | TEST MATERIAL No. | WC GRAIN DIAMETER μm | HARDNESS HRA | BENDING RESISTANCE kgf/mm² | ABRASION AMOUNT mg |
|---|---|---|---|---|---|
| MATERIAL OF ANOTHER EMBODIMENT OF PRESENT INVENTION | 1 | 1.0 | 95.3 | 85 | 6.2 |
| | 2 | 1.0 | 94.9 | 65 | 9.5 |
| | 3 | 1.0 | 95.3 | 85 | 5.8 |
| | 4 | 1.0 | 94.8 | 75 | 4.4 |
| | 5 | 1.0 | 94.9 | 60 | 6.9 |
| | 6 | 1.0 | 94.7 | 50 | 7.4 |
| | 7 | 0.5 | 95.5 | 80 | 3.5 |
| | 8 | 0.5 | 95.4 | 85 | 2.9 |
| | 9 | 0.5 | 94.9 | 55 | 7.8 |
| | 10 | 1.0 | 94.5 | 55 | 9.0 |
| | 11 | 1.0 | 95.4 | 70 | 5.5 |
| | 12 | 1.0 | 95.3 | 85 | 4.3 |
| | 13 | 1.0 | 95.0 | 60 | 7.7 |
| | 14 | 1.0 | 94.9 | 65 | 9.5 |
| | 15 | 1.0 | 95.3 | 85 | 7.2 |
| | 16 | 1.0 | 94.8 | 75 | 6.6 |
| | 17 | 1.0 | 95.0 | 60 | 4.4 |
| | 18 | 1.0 | 94.9 | 60 | 7.9 |
| | 19 | 1.0 | 94.8 | 50 | 6.2 |
| | 20 | 1.0 | 95.0 | 60 | 6.6 |
| CONVENTIONAL MATERIAL | 1 | 2.0 | 87.5 | 310 | 600.0 |
| | 2 | 1.0 | 91.0 | 270 | 111.0 |
| | 3 | 1.0 | 93.5 | 180 | 75.0 |
| MATERIAL OF ONE EMBODIMENT OF PRESENT INVENTION | 1 | 1.0 | 94.7 | 65 | 12.0 |
| | 2 | 1.0 | 94.5 | 110 | 11.0 |

TABLE 3

| | TEST MATERIAL No. | COMPOSITION (wt %) Ti | Zr | Hf | V | Nb | Ta | Cr | Mo | Co | Ni | C | N | W |
|---|---|---|---|---|---|---|---|---|---|---|---|---|---|---|
| CONVENTIONAL MATERIAL | 1 | | | | | | | | | 13.0 | | 5.33 | | BAL. |
| | 2 | | | | | | | | | 10.0 | | 5.52 | | BAL. |
| | 3 | | | | | | | | | 4.0 | | 6.05 | | BAL. |
| MATERIAL OF ANOTHER EMBODIMENT OF PRESENT INVENTION | 4 | 4.5 | | | 1.0 | | | | | 2.0 | | 6.95 | | BAL. |
| | 5 | 4.5 | | | 1.0 | | | | | | 2.0 | 6.95 | | BAL. |
| | 6 | 4.5 | | | 1.0 | | | | | 1.0 | 1.0 | 6.95 | | BAL. |
| | 7 | 4.5 | | | 1.0 | | | | | 1.0 | | 7.01 | | BAL. |
| | 8 | 4.5 | | | 1.0 | | | | | 0.2 | | 7.06 | | BAL. |
| | 9 | 4.5 | | | 1.0 | | | | | 1.0 | | 7.01 | | BAL. |
| | 10 | 4.5 | | | 1.0 | | | | | 1.0 | | 6.44 | | BAL. |
| | 11 | 3.0 | | | 2.0 | | | | 2.0 | 1.0 | | 6.91 | 0.75 | BAL. |
| | 12 | 2.0 | | 1.0 | 1.0 | | 1.0 | 1.0 | | 1.0 | | 6.66 | | BAL. |
| | 13 | | | 1.0 | 2.0 | | | | 1.0 | 1.0 | | 6.39 | | BAL. |
| | 14 | | | | 2.0 | | | 1.0 | | 0.5 | | 6.47 | | BAL. |
| | 15 | | | | 1.0 | | | 1.0 | | 0.5 | | 6.34 | | BAL. |

| | TEST MATERIAL No. | WC GRAIN DIAMETER μm | HARDNESS HRA | BENDING RESISTANCE kgf/mm² | ABRASION AMOUNT mg |
|---|---|---|---|---|---|
| CONVENTIONAL MATERIAL | 1 | 2.0 | 87.5 | 310 | 72.0 |
| | 2 | 1.0 | 91.0 | 270 | 13.0 |
| | 3 | 1.0 | 93.5 | 180 | 8.0 |
| MATERIAL OF ANOTHER EMBODIMENT OF PRESENT INVENTION | 4 | 1.0 | 94.5 | 110 | 2.2 |
| | 5 | 1.0 | 94.1 | 100 | 4.3 |
| | 6 | 1.0 | 94.2 | 100 | 3.8 |
| | 7 | 1.0 | 94.7 | 95 | 1.9 |
| | 8 | 1.0 | 94.9 | 75 | 1.5 |
| | 9 | 0.5 | 95.0 | 100 | 1.3 |
| | 10 | 1.0 | 94.8 | 90 | 1.4 |
| | 11 | 1.0 | 94.9 | 80 | 1.7 |
| | 12 | 1.0 | 94.7 | 65 | 1.7 |
| | 13 | 1.0 | 94.7 | 75 | 2.3 |
| | 14 | 1.0 | 94.8 | 85 | 2.1 |
| | 15 | 1.0 | 94.9 | 85 | 2.0 |

What is claimed is:

1. A high pressure injection nozzle member formed by liquid phase sintering without imparting external pressure consisting of a super hard alloy made from powder material comprising a tungsten carbide as a main component, wherein the tungsten carbide is composed of grains each having a diameter of less than 1μm, further comprising at least one kind of carbide or solid solution of carbide selected from Ti, Ta, V, Cr, Mo, Hf, or Zr by a total weight % of 0.5 to 10.0%, wherein the carbide materials include an amount of C defining a stoichiometric value, and a binding material, by weight % of 0.2 to 2.0%, consisting essentially of at least one of iron group elements, said super hard alloy having a high abrasion proof property and having a hardness more than HRA 94.5; wherein a mixing rate of said powder material of said super hard alloy is adjusted so that the amount of C therein after sintering is not more than 0.15 weight % lower than said stoichiometric value and greater than 0 weight %.

2. The high pressure injection nozzle member according to claim 1, wherein said iron group elements are Co, Ni and Fe.

3. The high pressure injection nozzle member according to claim 1, wherein said nozzle member is for an abrasive water jet.

4. A high pressure injection nozzle member formed by liquid phase sintering without imparting external pressure and consisting of a hard material of carbide series made from powder material mainly comprising a tungsten, wherein the hard carbide material is composed of grains each having a diameter of less than 1 μm, further comprising one, two or more kinds of carbides or solid solutions of carbides selected from Ti, Ta, V, Cr, Nb, Mo, Hf, or Zr by a total weight % of 0.5 to 10%, wherein the carbide materials include an amount of C defining a stoichiometric value, and a binding material, by weight % of 0.2 to 2.0%, consisting essentially of at least one kind of material selected from Co, Ni, Fe, Au, Ag, Cu alloy, or Al alloy, said nozzle member being formed of a hard sintered material having a high abrasion proof property and having a hardness more than HRA 94.0; wherein a mixing rate of said powder material of said super hard material is adjusted so that the amount of C therein after sintering is no more than 0.15 weight % lower than said stoichiometric value and greater than 0 weight %.

5. The high pressure injection nozzle member according to claim 4, wherein said nozzle member is for an abrasive water jet.

6. A high pressure injection nozzle member formed by liquid phase sintering without imparting external pressure and consisting of a hard material of carbide series made from powder material mainly comprising a tungsten carbide, wherein the hard carbide material is composed of grains each having a diameter of less than 1 μm, further comprising one, two or more kinds of carbides or nitride, or solid solutions of carbides or nitrides selected from Ti, Ta, V, Cr, Nb, Mo, Hf, or Zr by a total weight % of 0.5 to 10%, wherein the carbides include an amount of C defining a stoichiometric value, and a binding material, by weight % of 0.2 to 2.0, consisting essentially of at least one kind of material selected from Co, Ni, Fe, Au, Ag, Cu alloy, or Al alloy, said nozzle member being formed of a hard sintered material having a high abrasion proof property and having a hardness more than HRA 94.0; wherein a mixing rate of said powder material hard material is adjusted so that the amount of C therein after sintering is no more than 0.15 weight % lower than said stoichiometric value and greater than 0 weight %.

7. The high pressure injection nozzle member according to claim 6, wherein said nozzle member is for an abrasive water jet.

* * * * *